Apr. 24, 1923.

F. A. BREWER ET AL

BALL PULVERIZING MILL

Filed Aug. 11, 1921

1,452,786

Inventors
Frank A. Brewer and
George W. Branston
By Fred G. Dieterich
Attorneys

Patented Apr. 24, 1923.

1,452,786

UNITED STATES PATENT OFFICE.

FRANK A. BREWER AND GEORGE W. BRANSTON, OF VANCOUVER, BRITISH COLUMBIA, CANADA; SAID BREWER ASSIGNOR OF HIS ENTIRE RIGHT TO FRANK A. BREWER, JR., OF VANCOUVER, BRITISH COLUMBIA, CANADA.

BALL PULVERIZING MILL.

Application filed August 11, 1921. Serial No. 491,414.

*To all whom it may concern:*

Be it known that we, FRANK A. BREWER and GEORGE W. BRANSTON, citizen of the Dominion of Canada and subject of the King of Great Britain, respectively, residing at Vancouver, in the Province of British Columbia, Canada, have invented certain new and useful Improvements in Ball Pulverizing Mills, of which the following is a specification.

This invention relates to a rock pulverizer of that class wherein the crushing of the rock is effected by the rotation of a multiple series of balls around circular tracks shaped to the conformation of the lower part of the balls.

The improvements are directed to the manner of driving the balls whereby they are free to adapt themselves to the inequalities of the track and to the manner whereby the rock as pulverized is washed inward through the ball races in opposition to the centrifugal tendency outward.

The invention is particularly described in the following specification, reference being made to the drawings by which it is accompanied, in which.

Figure 1:
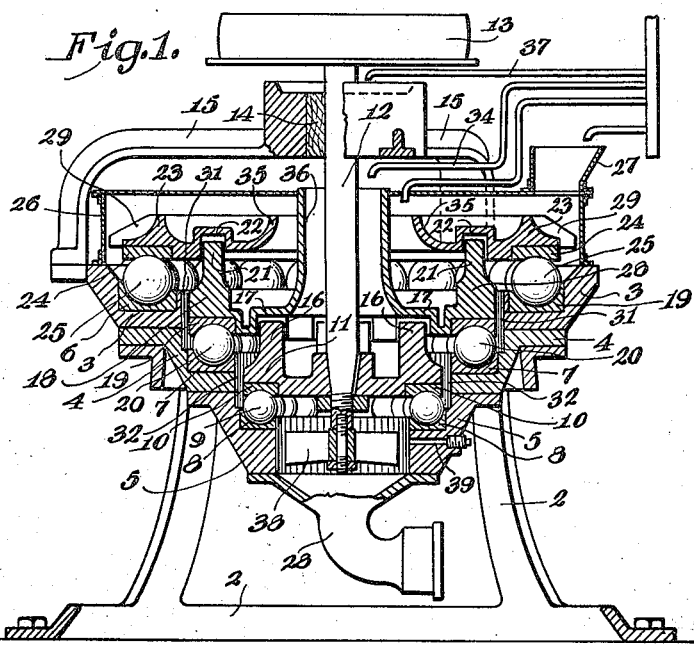
Fig. 1 is a vertical section through the device.
Figure 2:
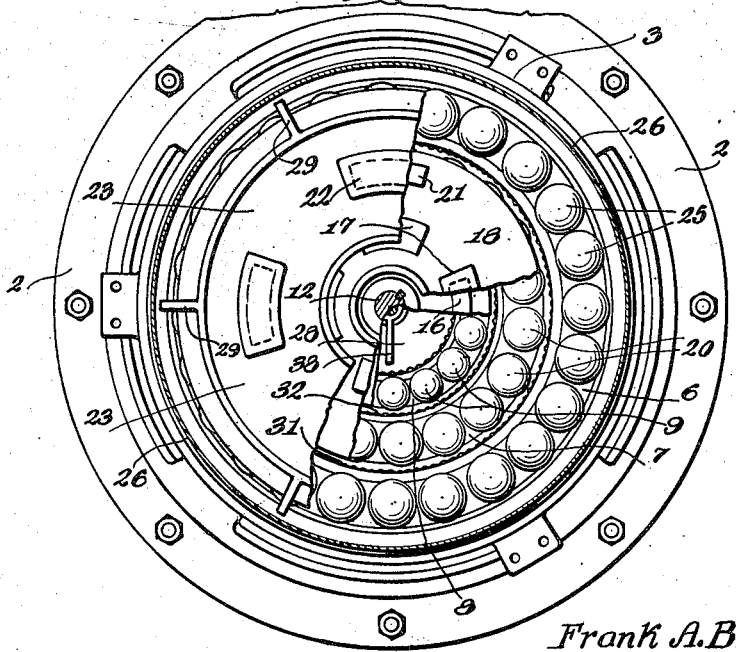
Fig. 2 is a plan with portions removed to show the successive ball rings and the agitator in the pulp delivery outlet.

In these drawings 2 represents a circular stand on which the entire machine is supported. The foundation rings 3, 4 and 5 of the grooved ball race rings are separately cast and are secured together by studs, the joints being rendered water-tight, preferably by means of a circumferential groove in the joint, into which a wire of soft metal, such as lead, may be laid before they are tightened up.

Each supporting ring 3, 4, and 5 is recessed to receive its ball race, 6, 7 and 8, so that these races are renewable and may be made of especially hard metal to stand the severe wear. As shown in the drawing the balls and the diameter of the races in which they run are stepped smaller downward, so that the upper ball race, into which the rock to be crushed is delivered and where the primary crushing is effected, has the largest wearing surface, the largest number of balls and the highest speed of movement.

The balls are spaced close together and on those 9 of the lower race rests a ring 10 of especially hard metal recessed into a driving head 11 secured on the lower end of a vertical shaft 12. Adjacent the upper end where the driving pulley 13 is secured, by which rotation is imparted, the shaft runs in a bearing 14 of lignum vitæ carried in a bridge bracket 15 secured to the upper ball race ring 3.

From the upper side of the driving head 11 portions 16 upwardly project to fit corresponding pockets 17 in the driving head 18 of the intermediate race of balls 20. This head 18 is recessed as before described to receive the ring 19 of especially hard metal which rests on the balls 20.

This driving head 18 has projections 21 which engage in pockets 22 formed in the driving head 23 of the upper race of balls 25, which driving head as before is recessed to receive a grooved bearing ring 24.

Secured to the outer edge of the upper supporting ring 3 is a water-tight casing 26 and in the top of this casing is a hopper opening 27 through which the ore to be crushed is delivered outside the upper ring of balls 25, and to the inner circle of the lower race ring 5 is secured a flared delivery pipe 28 through which the pulp is conveyed from the pulverizer for such further treatment as may be considered necessary.

In use, the rock to be pulverized is delivered at the feed hopper 27 with a sufficiency of water, and falls upon the outer edge of the upper driving head 23, which is shaped as shown in the drawing to receive it, and is provided with radial vanes 29 by which the rock is distributed around the annular space outside the upper race of balls. The conformation of the inner side of the ring 3, which carries the upper ball race ring 6 is such as will feed the rock directly to the balls.

The rock as pulverized in this ring of balls is carried by the water flow, inward through the balls in opposition to the centrifugal tendency outward, due to the circular movement of the driving head and balls. Therefrom it falls into the annular space 31 communicating with the intermediate race of balls 20 and receives a further supply of water delivered at 34 into an annular space between an upward projection 35 from the upper driving head, and a similar tubular projection 36 from the intermediate driving head 18.

This flow of water carries the pulverized material through between the balls of the intermediate ring in the same manner as in the upper ring, that is, in opposition to the centrifugal tendency outward. From the intermediate race of balls 20, the pulp and water are delivered into the annular space 32 between the intermediate ball ring and the lower driving head 11 and receives a further supply of water which is delivered at 37 to the lignum vitæ bearing of the shaft 12 and thereafter passes through the space between 36 and the shaft 12. The pulp as before is washed inward through the ball race by the water flow and is delivered into the flared delivery outlet 28.

In the annular spaces 31 and 32 between the race rings and the driving heads 18 and 11 and on the inner wall of the lower ring 5, rings of corrugated amalgamated metal are introduced against which the pulp is splashed by rotation of the driving heads and on which any free gold will be caught before passing through the next race of balls or from the machine.

To project the pulp against the amalgamating plate in the space between the lower race of balls 9 and the outlet 28 an agitator 38 is secured in the lower end of the shaft 12 to rotate with it. If the character of the ore being crushed is such as to require it, a cyaniding solution may be introduced at 39 and agitated with the pulp, in which case the amalgamating plate of this chamber is not required.

These features of amalgamation and provision for cyaniding are not material to the function of the machine as a pulverizer, but are valuable adjuncts for the introduction of which the machine is particularly adapted.

If the rock is crushed to the desired fineness before amalgamation, the finer particles of free gold are liable to be carried away in the slimes, whereas in this mill the amalgamation is provided for in each successive stage of the crushing whereby this defect is in large measure provided against.

By adopting a bearing of wood for the driving shaft 12, which bearing may be lubricated with water, the use of oil in the mill is entirely avoided, the presence of which oil is objectionable in amalgamation.

Although the machine has been designed as a wet mill with provision for delivering water to wash the pulp inward through the ball races, in opposition to the centrifugal tendency outward, the construction of the mill is particularly favourable for dry milling. Naturally, when used as a dry mill, the water by which the lignum vitæ bearing 14 of the driving shaft is lubricated is prevented passing into the ball races.

In addition to the advantages which the machine possesses in effectively crushing the rock, and the facility which it affords for recovering the free gold by amalgamation, it is also particularly accessible for examination and for repair and the several parts are none of them of such weight as will be troublesome in transportation.

Having now particularly described our invention, we hereby declare that what we claim as new and desire to be protected in by Letters Patent, is:

1. A ball pulverizer, comprising the combination with a suitable base, of a series of concentrically grooved rings supported in stepped relation thereon, balls in the grooves of the several rings, a driving head grooved to rest on the balls in the innermost ring, a shaft secured to that driving head by which it is rotated, a grooved driving ring separately mounted on each other ring of balls, each of which driving rings except the bottom one is in driving connection with the one next smaller in diameter but is independent of direct attachment to the driving shaft, means for delivering the rock to be crushed outside the outermost ring of balls, means for distributing it around the ring, and means for delivering the ore as crushed in one ring to the next inner ring and from the innermost ring to the delivery outlet.

2. A ball pulverizer, comprising the combination with a suitable base, of a series of concentrically grooved rings supported in stepped relation thereon, balls in the grooves of the several rings, a driving head grooved to rest on the balls in the innermost ring, a shaft secured to that driving head by which it is rotated, a grooved driving ring separately mounted on each other ring of balls, each of which driving rings except the bottom one is in driving connection with the one next smaller in diameter but independent of direct attachment to the driving head or the driving shaft, means for delivering the rock to be crushed outside the outermost ring of balls, means for distributing it around the ring, and means for delivering the ore as crushed in one ring to the next inner ring and from the innermost ring to the delivery outlet, said means comprising a current of fluid from the outer side of each ring inward and from the innermost ring to the delivery outlet.

3. A ball pulverizing mill, comprising the combination with a suitable base, of a series of concentrically grooved rings supported in stepped relation thereon, balls in the grooves of the several rings, a driving head grooved to rest on the balls in the innermost ring, a shaft secured to that driving head by which it is rotated, a grooved driving ring separately mounted on each other ring of balls, each of which driving rings except the bottom one is in driving connection with the one next smaller in diameter but independent of direct attachment to the driving head or the driving shaft, means for delivering the rock to be crushed outside the outermost ring of balls, means for distributing it around the ring, and means for delivering water with the rock outside each ring of balls.

4. A ball pulverizing mill, comprising the combination with a suitable base, of a series of concentrically grooved rings supported thereon and stepped downward from the outer ring to the lowest inner ring, balls in the grooves of the several rings, a driving head grooved to rest on the balls in the bottom ring, a shaft secured to that driving head and by which it is rotated, a grooved driving ring mounted on each other ring of balls, each driving ring independent of direct attachment to the lower driving head but each ring except the bottom one being in driving connection with the one beneath, means for delivering the rock to be crushed outside the uppermost ring of balls, means for distributing the rock around the ring, and means for admitting a fluid outside each ring of balls that will carry the rock as crushed from that ring to the next one within and from the inner ring to the delivery outlet.

5. A ball pulverizing mill, comprising the combination with a suitable base, of a series of concentrically grooved rings supported thereon and stepped downward from the outer ring to the lowest inner ring, balls in the grooves of the several rings, the diameter of the balls being proportioned to the diameter of the rings, a driving head grooved to rest on the bottom ring of balls, a shaft secured to that driving head and by which it is rotated, a grooved driving ring mounted on each ring of balls, each driving ring being independent of direct attachment to the lower driving head but each except the bottom one in driving connection with the one beneath, means for delivering the rock to be crushed outside the uppermost ring of balls, means for distributing the rock around the ring, and means for admitting a fluid outside each ring of balls that will carry the rock as crushed from that ring to the next one within and from the inner ring to the delivery outlet.

6. A ball pulverizing mill, comprising the combination with a suitable base, of a series of separable concentrically grooved rings supported thereon and stepped downward from the outer ring to the lowest inner ring, balls in the several grooves, a driving head grooved to rest on the balls in the bottom ring, said driving head having upward projections, a shaft secured to that driving head and by which it is rotated, a separate grooved driving head mounted on each ring of balls, each head adapted to engage the projections from the head beneath and having projections to engage the driving head above, means for delivering the rock to be crushed outside the upper ring of balls, means on the upper driving head for distributing the rock around the ring, and means for admitting a fluid outside each ring of balls that will carry the rock as crushed from that ring to the next one beneath and from the bottom ring to the delivery outlet.

7. A ball pulverizing mill, comprising the combination with a suitable base, of a series of concentrically grooved rings supported thereon and stepped downward from the outer ring to the lowest inner ring, balls in the grooves of the several rings, a driving head grooved to rest on the balls in the bottom ring, a shaft secured to that driving head and by which it is rotated, a grooved driving ring mounted on each other ring of balls, each driving ring except the bottom one being in driving connection with the one beneath or within the driving head, means for delivering the rock to be crushed outside the upper ring of balls, means for distributing the rock around the ring, means for admitting a fluid under pressure outside each ring of balls that will carry the rock as crushed from that ring to the next one within and from the inner ring to the delivery outlet, and a ring of amalgamated metal between each ring of balls and the one beneath and between the lowest ring of balls and the delivery outlet.

8. A ball pulverizing mill, comprising the combination with a suitable base, of a series of concentrically grooved rings supported thereon and stepped downward from the outer ring to the lowest inner ring, balls in the grooves of the several rings, a driving head grooved to rest on the balls in the bottom ring, a shaft secured on that driving head and by which it is rotated, a grooved driving ring mounted on each other ring of balls, each ring except the bottom one being independent of direct attachment to the lower driving head but in driving connection with the driving ring beneath, means for delivering the rock to be crushed outside the upper ring of balls, means for distributing the rock around the ring, means for admitting a fluid under pressure outside each ring of balls that will carry the rock as crushed from that ring to the next one within and from the inner ring to the delivery outlet, and a ring of amalgamated metal vertically disposed between each ring of balls and the one beneath and between the lowest ring of balls and the delivery outlet.

9. A ball pulverizing mill, comprising the combination with a suitable base, of a series of concentrically grooved rings supported thereon and stepped downward from the outer ring to the lowest inner ring, balls in the grooves of the several rings, a driving head grooved to rest on the balls on the bottom ring, a shaft secured to that driving head and by which it is rotated, a grooved driving ring mounted on each other ring of balls, each driving ring except the bottom one, being independent of direct attachment to the driving head but in driving connection with the driving ring beneath, means for delivering the rock to be crushed outside the upper ring of balls, means for distributing the rock around the ring, means for admitting a fluid under pressure outside each ring of balls that will carry the rock as crushed from that ring to the next one within and from the inner ring to the delivery outlet, and a ring of corrugated amalgamated metal vertically disposed between each ring of balls and the one beneath and between the lowest ring of balls and the delivery outlet.

10. A ball pulverizing mill, comprising the combination with a suitable base, of a series of concentrically grooved rings supported on the base and arranged in stepped order, said rings being of different diameters, that of the greatest diameter being at the top and that of the least diameter being at the bottom, sets of balls in the grooves of the several rings, grooved driving heads over the several sets of balls, means for turning said driving heads, means for delivering the material to be pulverized to the uppermost ring, means for receiving the pulverized material from within the circumference of the lowermost ring, said rings above the lowermost ring adapted to discharge progressively inward and downward to the next succeeding ring, substantially as shown and described.

In testimony whereof we affix our signatures.

FRANK A. BREWER.
GEORGE W. BRANSTON.